(12) United States Patent
     Abel et al.

(10) Patent No.: US 10,151,139 B2
(45) Date of Patent: Dec. 11, 2018

(54) VOTING MULTI-CART

(71) Applicants: Gary V Abel, Ellicott City, MD (US);
     Joseph Wilson, Spencer, WV (US)

(72) Inventors: Gary V Abel, Ellicott City, MD (US);
     Joseph Wilson, Spencer, WV (US)

(*) Notice: Subject to any disclaimer, the term of this patent is extended or adjusted under 35 U.S.C. 154(b) by 0 days.

(21) Appl. No.: 15/599,985

(22) Filed: May 19, 2017

(65) Prior Publication Data
     US 2017/0314322 A1    Nov. 2, 2017

Related U.S. Application Data

(63) Continuation of application No. 14/739,949, filed on Jun. 15, 2015, now Pat. No. 9,719,294.

(60) Provisional application No. 62/472,186, filed on Mar. 16, 2017, provisional application No. 62/338,766, filed on May 19, 2016.

(51) Int. Cl.
     | *B62B 3/02* | (2006.01) |
     | *E06B 9/24* | (2006.01) |
     | *G07C 13/02* | (2006.01) |
     | *B62B 3/10* | (2006.01) |

(52) U.S. Cl.
     CPC ............. *E06B 9/24* (2013.01); *G07C 13/02* (2013.01); *B62B 3/02* (2013.01); *B62B 3/10* (2013.01)

(58) Field of Classification Search
     CPC ....... A47B 46/00; B62B 3/02; B62B 2205/32; B62B 2205/33; B25H 1/04; B25H 1/12; A47F 5/137
     See application file for complete search history.

(56) References Cited

U.S. PATENT DOCUMENTS

| 3,834,724 A * | 9/1974 | Trubiano ................ B62B 3/002 |
| | | 280/33.996 |
| 8,006,986 B1 * | 8/2011 | Pazhoor ................ E04H 1/1255 |
| | | 280/47.34 |
| 2005/0212233 A1 | 9/2005 | Hall |
| 2008/0302585 A1 | 12/2008 | Perelli |
| 2011/0285100 A1 * | 11/2011 | Pazhoor ................ E04H 1/1255 |
| | | 280/47.35 |
| 2012/0031510 A1 | 2/2012 | Weissenbach |
| 2012/0223501 A1 | 9/2012 | Benoit |

* cited by examiner

*Primary Examiner* — Bryan A Evans
(74) *Attorney, Agent, or Firm* — Gordon Feinblatt LLC; Royal W. Craig

(57) ABSTRACT

A multi-compartmentalized utility cart for storage, transport and or deployment of a quadrangle of four private voting terminals for generating paper ballots (one being ADA-compliant), or alternatively two four private voting stations plus a private VVPB tabulation station, all without moving the equipment off the multi-cart. The present invention provides the foregoing complete with multiple on-board optional deployable privacy panels and optional curtains attached to the cart at each station to enclose a voter standing or seated in front of the voting terminal or ballot box.

25 Claims, 10 Drawing Sheets

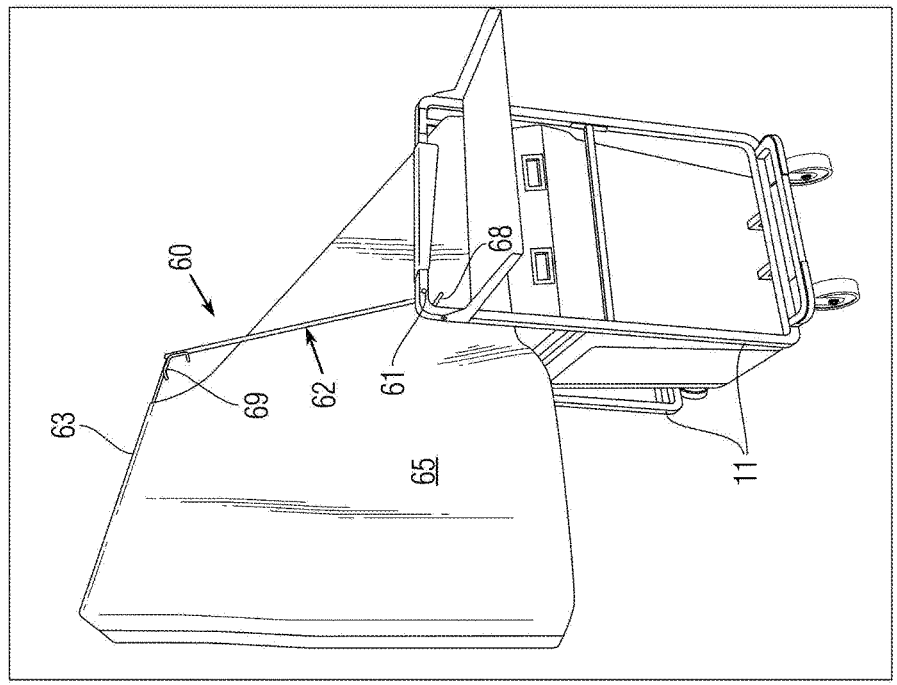
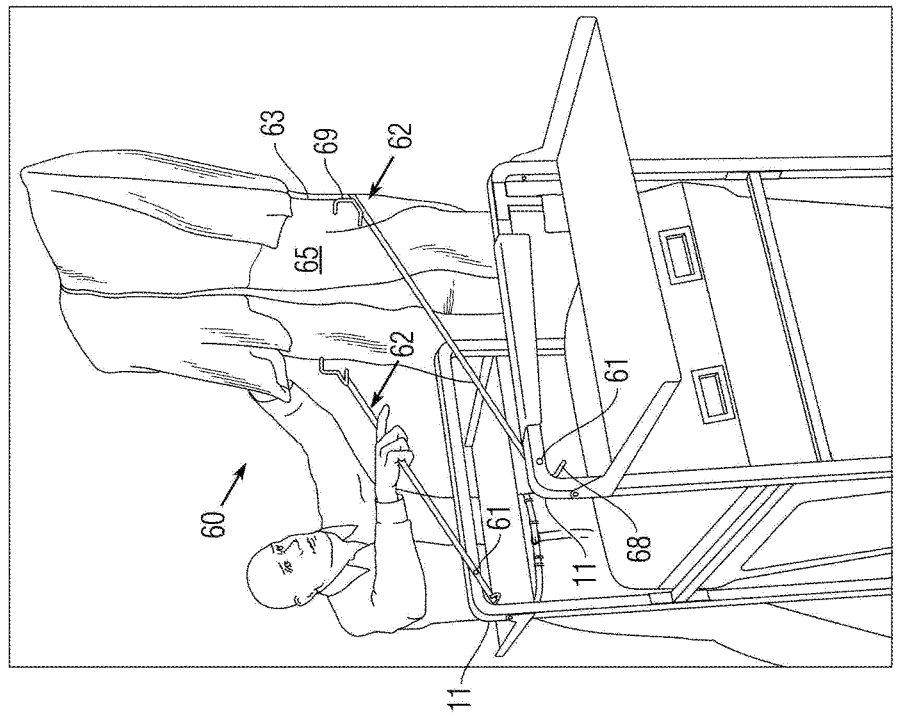

VOTING MULTI-CART

CROSS-REFERENCE TO RELATED APPLICATION(S)

The present application derives priority from U.S. Provisional Patent Application 62/472,186 filed 16 Mar. 2017, and derives priority from U.S. Provisional Patent Application 62/338,766 filed 19 May 2016, and is a continuation of U.S. application Ser. No. 14/739,949 filed 15 Jun. 2015, which derives priority from New U.S. Provisional Patent Application 62/103,189 filed 14 Jan. 2015.

BACKGROUND a. Field of Invention

The invention relates to utility carts for voting equipment and, more particularly, to a specially-adapted multi-compartmentalized utility cart for storage, transport and or deployment of four touch voting terminals needed to create a quadrangle of private voting stations (one or more being ADA-compliant), all without moving the equipment off the utility cart.

b. Background of the Invention

Due to the infrequent nature of public elections, voting equipment is kept in storage for each voting precinct, normally at a central storage warehouse, and at elections, utility carts are used for transporting the equipment from storage to a public forum, and vice versa after the election. Voting machines are valuable electronic devices and are heavy. Thus, a very robust utility cart is required to carry such devices. Still, elderly election officials often experience great difficulty in moving, lifting, packing, unpacking the voting equipment out of and onto utility carts or tables. Many precincts are now moving toward a paper-based voting system, in particular, a Voter Verified Paper Ballot (VVPB) system station inclusive of touch terminal voting stations for generating punched or printed paper ballots, in combination with a ballot box tabulation station for counting the paper ballots. Voters first use the VVPB terminals to generate paper ballots, then move to the ballot box tabulation station and feed in their ballots for counting. VVPB provides an effective paper trail by which to independently audit the election results. VVPB balloting systems additionally comprise a plurality of separate touch-screen ballot printers or manual ballot marking terminals, for example, to assist disabled voters in marking their paper ballots. Examples of such terminals include the ES&S AutoMARK voter assist terminal (48 lbs. and approximately 1.5'×2'×1'), and the ES&S ExpressVote voter assist terminal (20 lbs. and approximately 16"×19.8"×13"), although the dimensions of these and other balloting units may change between storage and deployment. Typically in the paper balloting system, each precinct will also provide one or more special voting terminals for handicapped persons. For example, the above-referenced ES&S AutoMARK™ voter assist terminal is a ballot-marking system designed to provide privacy and accessibility to voters who are blind, vision-impaired, or have a disability or condition that would make it difficult or impossible to mark a ballot with a typical paper ballot system.

VVPB systems introduce logistical complexity inasmuch as what could be done with a single all-electronic voting terminal now takes both a voting terminal and a ballot box/tabulator. Adding to the complexity, the Americans with Disabilities Act (ADA) requires that people with disabilities can access and use their voting facilities. The ADA's regulations and the ADA Standards for Accessible Design prescribe that some of the VVPB voting terminals and some of the ballot box tabulation stations at any facility accommodate wheelchair voters at the polling place. ADA standards make it difficult to design a VVPB-compatible utility cart that keeps a terminal ready to use by the voter while still seated in a tamper-proof cart.

The present inventors provided a partial solution for this in their U.S. Pat. No. 9,058,708, which describes a voter cart with on-board deployable privacy curtain suspended from articulating support members pivotally attached to the cart. When deployed the privacy curtain suspends itself around a tall substantially enclosed area in front of a voting terminal seated in the cart, and encloses a voter standing or seated in front of the voting terminal. This renders the terminal ready to use by the voter without ever removing the voting terminal from the cart, and so the terminal remains in the tamper-proof cart during voting as well as during transport and storage. However, this creates just one voting station.

The present inventors have now determined that a preferred VVPB station would increase the number of VVPB terminals and separate them from the ballot counter. Specifically, an optimal arrangement would include four private voting stations each with VVPB terminals for generating paper ballots, one being ADA-compliant. Of course, a high-degree of space-optimization and modularity is required to adapt a single cart to deploying four such voting stations in a quadrangle such that the voting terminals all articulate from a stowed position in which they are fully restrained against lateral and vertical motion, to a deployed position in which voters are given full access to their touch screens. Moreover, any transport cart design should keep weight to a minimum with a framework that is as light weight as possible. What is needed is a multi-compartmentalized cart with robust mechanical restraints to protect against shifting of the equipment and yet full frontal and side access to both pieces of equipment to allow access to the consoles.

It would be greatly advantageous to provide a quad-station utility cart for storage, transport and or deployment of a plurality of complete private VVPB voting terminals all without moving the equipment off the utility cart. The present invention provides the foregoing with a multi-voting cart arranged in a quadrangle with multiple reconfigurable shelves for the voting equipment, robust mechanical restraints to protect against shifting of the equipment, and full frontal yet private access to each station achieved with privacy curtains attached to the cart. The cart also preserves each piece of equipment within a secure tamper-proof framework that is as light weight as possible without sacrificing stability and security, and which allows easy removing and off- and on-loading. The design is modular to allow additional carts and/or stations to be integrally changed or attached as needed.

In a preferred embodiment the multi-voting cart is configured as a voting quadrangle with flip-mounts for the voting terminals, at least one voting station being ADA complaint for wheelchair access. A lightweight partition system with deployable privacy curtains is attached to the cart to ensure privacy at each station. The multi-voting cart is easily reconfigurable to accommodate a private VVPB tabulation station instead of the front and back voting terminals. This results in two private endwise voting stations for generating paper ballots, plus a private VVPB tabulation station accessible from the front of the multi-cart. One or more of the stations can be equipped with an optional on-board deployable privacy mechanism to enclose a voter standing or seated in front of the voting terminal or ballot box.

SUMMARY OF THE INVENTION

It is, therefore, an object of the present invention to provide a storage and transport cart specifically adapted for VVPN voting terminals and, optionally, ballot box tabulation equipment that is easily configurable for storing and transporting a variety of election equipment as required by various precincts such that the same cart can be utilized by multiple precincts and can adapt to transport and store technologically evolving voting machinery.

It is a specific object to provide a storage and transport cart for supporting and protecting two to four touch-screen voting terminals such as the AutoMARK™ or ExpressVote™ (vendor specifications indicate each weighs 48 pounds) in a private quadrangle array.

It is another object to provide a storage and transport cart that provides a novel privacy screen comprising a fixed partition and optional deployable privacy curtains attached to the cart at each station to enclose a voter standing or seated in front of the voting terminal.

It is another object to provide a storage and transport cart that is easily reconfigurable to accommodate a private VVPB tabulation station instead of the front and back voting terminals, this resulting in two private endwise voting stations for generating paper ballots, plus a private VVPB tabulation station accessible from the front of the multi-cart.

It is another object to provide a storage and transport cart with an optional on-board deployable privacy mechanism to enclose a voter standing or seated in front of the voting terminal or ballot box.

It is still another object to provide a storage and transport cart as above that provides robust mechanical restraints to protect against shifting of the equipment, and yet provides full frontal and side access to each piece of equipment to allow easy off- and on-loading.

It is still another object to provide a storage and transport cart as above that maximizes strength and usability, and yet keeps weight to a minimum with a framework that is as light weight as possible, thereby allowing for safe handling of same by polling workers of all ages and physical abilities, even when fully laden with heavy voting equipment.

According to the present invention, the above-described and other objects are accomplished by providing a multi-compartmentalized utility cart for storage, transport and or deployment of a quadrangle of four private voting terminals for generating paper ballots (one being ADA-compliant), all without moving the equipment off the multi-cart. The present invention provides the foregoing complete with a privacy screen comprising a fixed partition and multiple on-board optional/deployable privacy curtains attached to the cart at each station to enclose a voter standing or seated in front of the voting terminal or ballot box.

The multi-cart is capable of supporting four touch-screen VVPN voting terminals all in a useable position. The cart is generally formed with a pair of opposing side-rails defined by contiguous tubing bent in a closed rectangular loop with horizontal struts for supporting voting terminals in a quadrangle array. In an embodiment, the multi-cart further comprises a platform floor spanning the side-rails at bottom and a plurality of lateral struts joining the side-rails at mid-level. Castors are mounted beneath the side rails, and an array of stand assemblies mounted on the lateral struts in a quadrangle configuration for securing voting terminals. Preferably at least one of the stand assemblies allows pivoting of a voting terminal about a first axis, and the platform floor has a pivoting panel that pivots about a second axis parallel to the first axis. In another embodiment the front and back stand assemblies are removed, the side-rails are moved closer together, and the end-mounted stand assemblies moved outside of the side-rails onto shelves. This makes room for replacing two of the voting terminals with a VVPB tabulation station installed, resulting in a compact unit with either four voting terminals (two of which are non-permanent and supported on retractable shelves) or two endwise voting terminals and one VVPB tabulation station.

BRIEF DESCRIPTION OF THE DRAWINGS

Additional aspects of the present invention will become evident upon reviewing the embodiments described in the specification and the claims taken in conjunction with the accompanying figures, wherein like numerals designate like elements, and wherein:

FIG. 9 is a perspective view illustrating the initial deployment of a removable privacy mechanism 60 on the multi-cart 10 of FIGS. 7-8.

FIG. 9 is a perspective view illustrating the initial deployment of a removable privacy mechanism 60.

FIG. 10 is a perspective view illustrating the completed deployment of a removable privacy mechanism 60 of FIG. 9.

DETAILED DESCRIPTION OF THE PREFERRED EMBODIMENT

The present invention is an adaptable multi-cart designed for storage and/or transport of multiple and various types of voting machines and accessory components in a convenient, safe and readily accessible manner.

Figure 1:
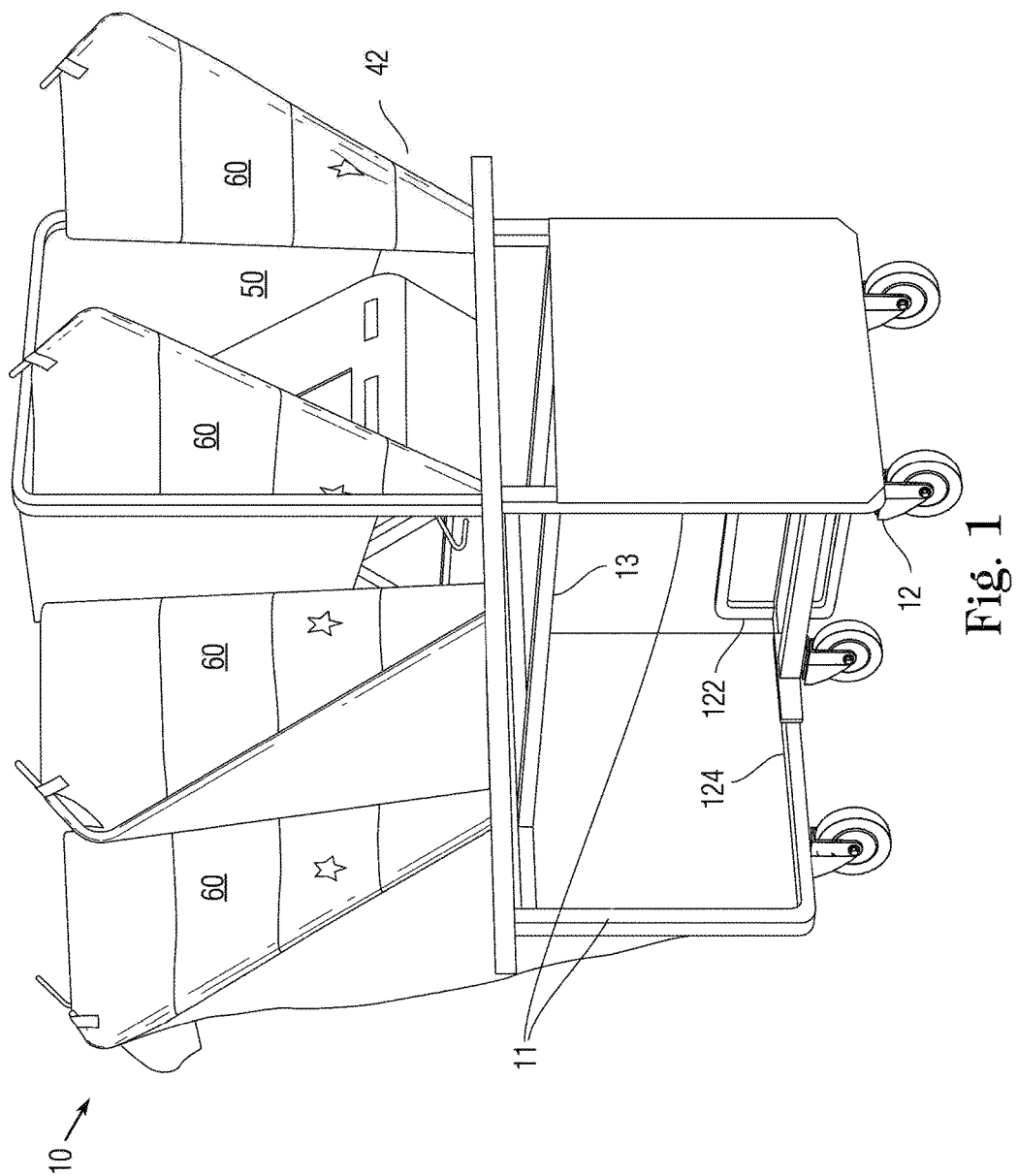
FIG. 1 is a perspective view of the multi-cart 10 according to a first embodiment the present invention, configured for supporting a quadrangle of touch-screen voting terminals.
Figure 2:
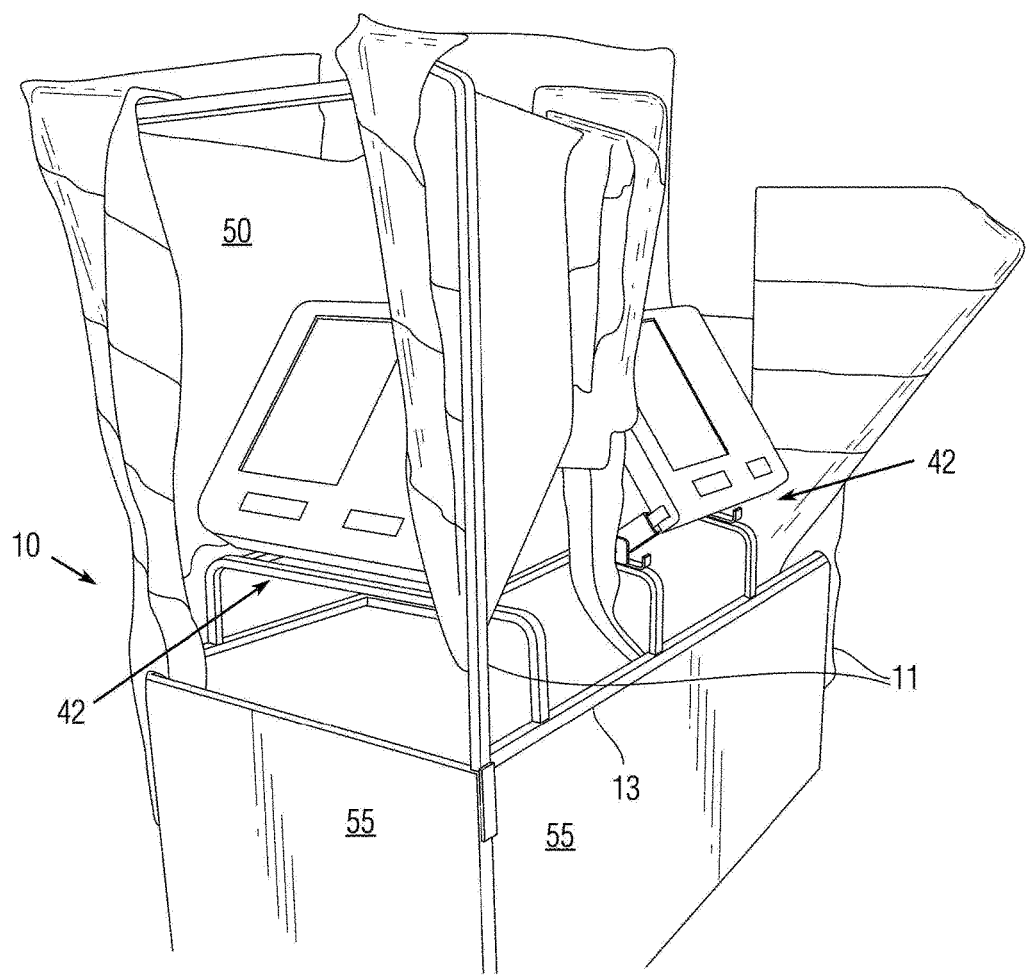
FIG. 2 is an opposite perspective view of voter cart 10 of FIG. 1.
Figure 3:
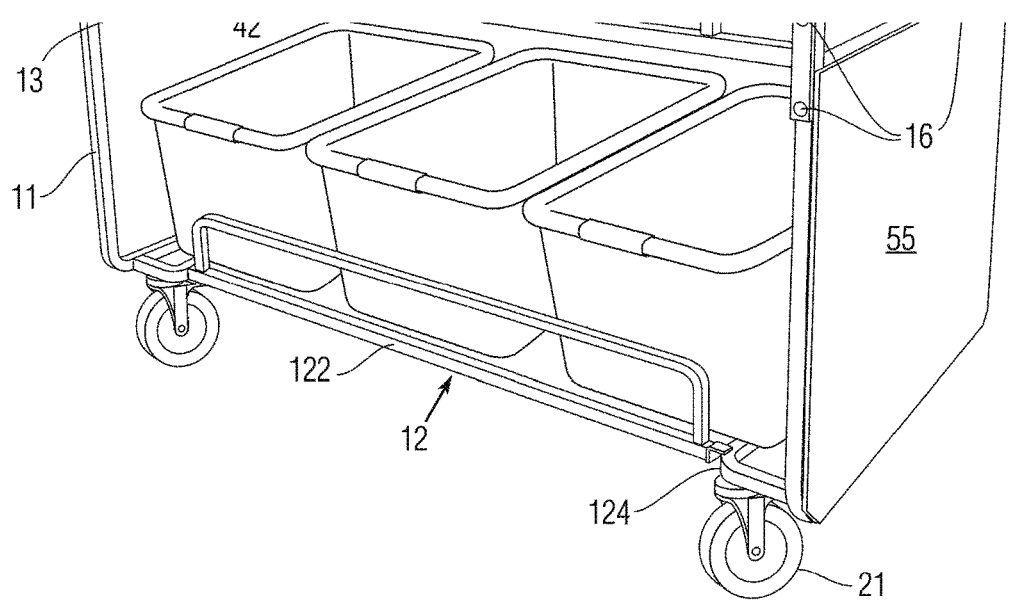
FIG. 3 is a side perspective view of the voter cart 10 of FIGS. 1-2 with privacy curtains removed.
Figure 4:
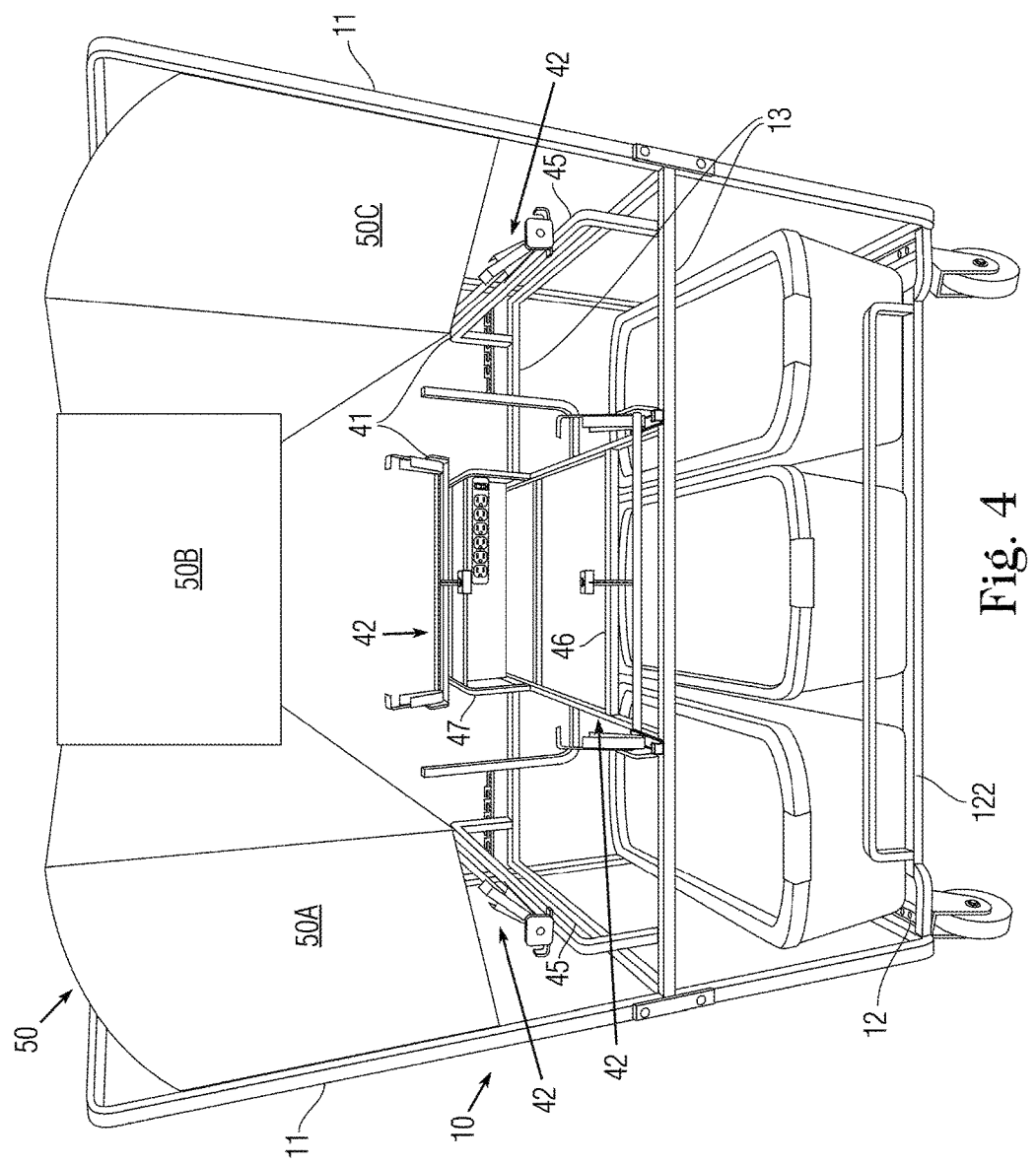
FIG. 4 is a front close-up perspective view of voter cart 10 of FIGS. 1-3.

FIGS. 1-4 are perspective views of voter cart 10 according to an embodiment of the present invention, with optional privacy curtains removed in FIGS. 3-4. With combined reference to FIGS. 1-4, the voter cart 10 generally comprises an opposing pair of side-rail assemblies 11 attached in a spaced relation by a lower platform 12 and a medial horizontal semi-removable framework 13 formed by a rectangle of cross-struts. Medial platform 13 supports a quad-array of voting terminal mounting assemblies 42, each articulating about a horizontal axis for tilt-positioning of the respective voting terminals. The front-facing voting terminal mounting assembly 42 is elevated 4-6" lower than the others to provide an ADA voting terminal suitable for wheelchair access, and the surrounding assemblies 42 are elevated for standing access. A swing-up floor 122 straddles the front of lower platform 12 and, when pivoted as shown in FIG. 4 provides frontal support (in conjunction with lower platform 12) for supporting a plurality of plastic storage bins for transporting supplies. Upon deployment, swing-up floor 122 can be pivoted upward to the back of the lower platform 12 (and storage bins removed) as seen in FIG. 1 to provide full frontal ingress to voter cart 10 for a wheelchair or chair.

Referring to FIG. 4, the two side-facing terminal mounting assemblies 42 are mounted atop inverted U-shaped risers 45 that each straddle the front and rear cross-struts of medial platform 13 approximately 3-5" inward of the respective side-rail assemblies 11.

Cross struts 13 also support an H-shaped platform 46 with two medial spans spanning the front and rear cross struts of medial platform 13. H-shaped platform 46 is semi-removable and supports the two front-and-back facing terminal mounting assemblies 42. The rear-facing terminal mounting assembly 42 is likewise mounted atop a riser 47 approximately 3-5" inward of the rear cross strut 13, riser 47 straddling the two medial spans of H-shaped platform 46 (which in turn span the front and rear cross struts of medial platform 13). This configuration results in three of four voting terminal mounting assemblies 42 (the rear and side assemblies) being elevated for standing voters while the front voting terminal mounting assembly 42 is mounted directly to the cross strut 13 to position it at the proper height for a seated (ADA) voter. All four voting terminal assemblies 42 employ identical articulating equipment supports 41 as will be described to allow the voting terminals supported thereby to rotate from a deployed (angled) position to a stowed position. Importantly, the front and rear articulating equipment supports 41 are configured allow the voting terminals supported by these two supports to rotate rearward approximately 110 degrees from an upstanding angle (deployed) to a fully horizontal (stowed) position. Conversely, the side articulating equipment supports 41 are configured to allow the voting terminals supported by these two supports to rotate rearward approximately 90 degrees from an upstanding angle (deployed) to a downwardly-inclined (stowed) position. The latter less-than-horizontal stowed position keeps overall cart length to a minimum (if the voting terminals at the ends of the cart 10 were stowed in a full horizontal position the cart 10 would need to be considerably longer to accommodate them). Each side voting terminal mounting assembly 42 (with articulating equipment supports 41) supports one voting terminal at an appropriate voting level for either standing or seated (ADA) voting, angled upward, facing a voter standing or seated at each voter cart 10. The front voting terminal mounting assembly 42 (and articulating equipment support 41) supports a voting terminal at waist level facing a voter seated (ADA) in front of the voter cart 10.

An upper privacy screen 50 subdivides the center area between side-rail assemblies 11 into a quadrangle array of private voting stations, shielding each voter standing or seated at voter cart 10 from the other voters and voting terminals. Side and rear lower privacy screens 55 partially enclose the lower volume on three sides, leaving the cart 10 open at the front for wheelchair access as well as useable additional storage when the cart 10 is in transport or not being used for voting. The multi-compartmentalized utility cart 10 generally facilitates storage, transport and deployment of a quadrangle of four private voting stations for generating paper ballots (one being ADA-compliant). The multi-cart 10 also allow quick and convenient reconfiguration by removal of the H-shaped platform 46 spanning the front and rear cross struts of medial platform 13 (together with the two front-and-back facing terminal mounting assemblies 42 into a two-station cart with central VVPB tabulation station as will be described.

Referring back to FIG. 1, the privacy screen further comprises eight optional deployable privacy curtains 60 attached in pairs on flanking sides of cart 10. Each pair of privacy curtains 60 effectively extends each open trapezoid of the upper privacy screen 50 (see FIG. 2) to block peripheral vision and extend each voter's private alcove outward. Each removable privacy curtain 60 further comprises a trapezoidal tubular skeleton held captive within the seams of a fabric panel. The privacy curtains 60 are attached as shown between the respective side-rail assemblies 11 and medial platform 13 (see FIG. 4) and form open enclosures with the panels of privacy screens 50A-C (best seen in FIG. 3) to ensure voter privacy.

Each side-rail 11 is formed from hollow tubular stock bent-and-welded into a continuous substantially rectangular shape with rounded corners. Cross-struts 13 (see FIG. 3) run side-to-side from one side-rail 11 to another, and grip the side-rails via perpendicular yokes attached at the distal ends. The yokes are secured to the side-rails 11 by one-way tamperproof bolts 16 (see FIG. 3) which traverse the yokes and engage holes in the side-rails 11 to lock the cross-struts 13 in position.

As best seen in FIG. 3, the swing-up floor 122 of lower storage platform 12 seats down against two opposing platform sections 124 each protruding laterally inward approximately 5" from the bottom of side rails 11. The two opposing platform sections 124 are each bolted or welded to the sides of side rails 11 and protrude inward. Each of the opposing platform sections 124 further comprises hollow tubular stock bent-and-welded into an elongate U-shape with rounded corners and reinforced medially by an elongate cross-strut. The two opposing platform sections 124 protruding inward from side rails 11 provide a stop-limit to pivoting of swing-up floor 122 which rests there atop. Swing-up floor 122 further comprises a plurality of lateral cross-struts bound endwise in a framework by right-angle-brackets welded thereto. A U-shaped retaining lip is welded across the forefront of swing-up platform 122. A U-shaped retaining lip may be welded across the two opposing platform sections 124 at the rear as well. Swing-up floor 122 is hinged at the rear, and right-angle-brackets protruding outward from swing-up floor 122 provide a tongue-and-groove fit against the two opposing platform sections 124. This way, the swing-up floor 122 may be pivoted up and out of way to accommodate a wheelchair voter or pivoted down against the two opposing platform sections 124 to provide floor for supporting stowed voting terminals, or other voting supplies or a centrally-positioned VVPB tabulation station.

Four wheel assemblies 21 are mounted at the bottom corners of the side-rails 11, and these are heavy duty pivoting castor wheel assemblies 21 (preferably locking castors) for portability. Wheel assemblies 21 are attached at the corners of platform sections 124 proximate side rails 11 to maximize wheelbase.

Figure 5:
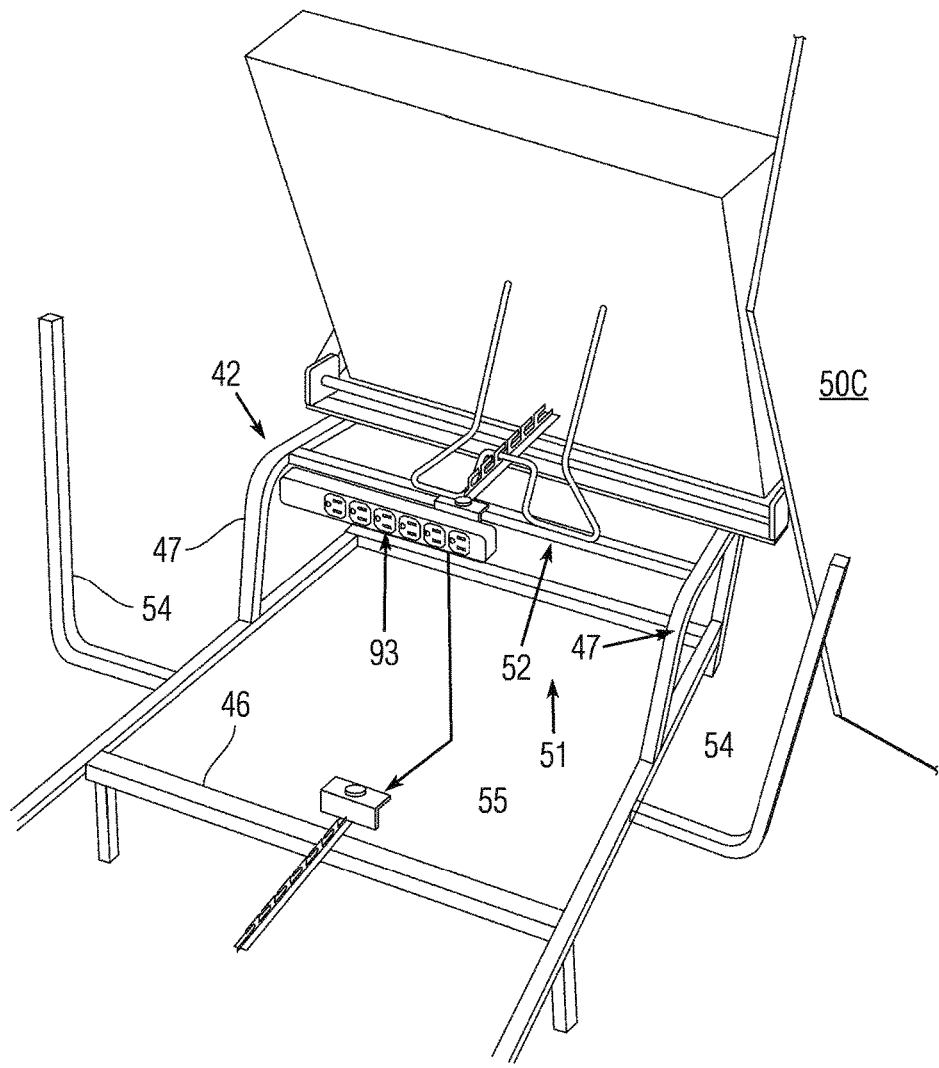
FIG. 5 is a close-up rear perspective view of one of the articulating equipment supports.
Figure 6:
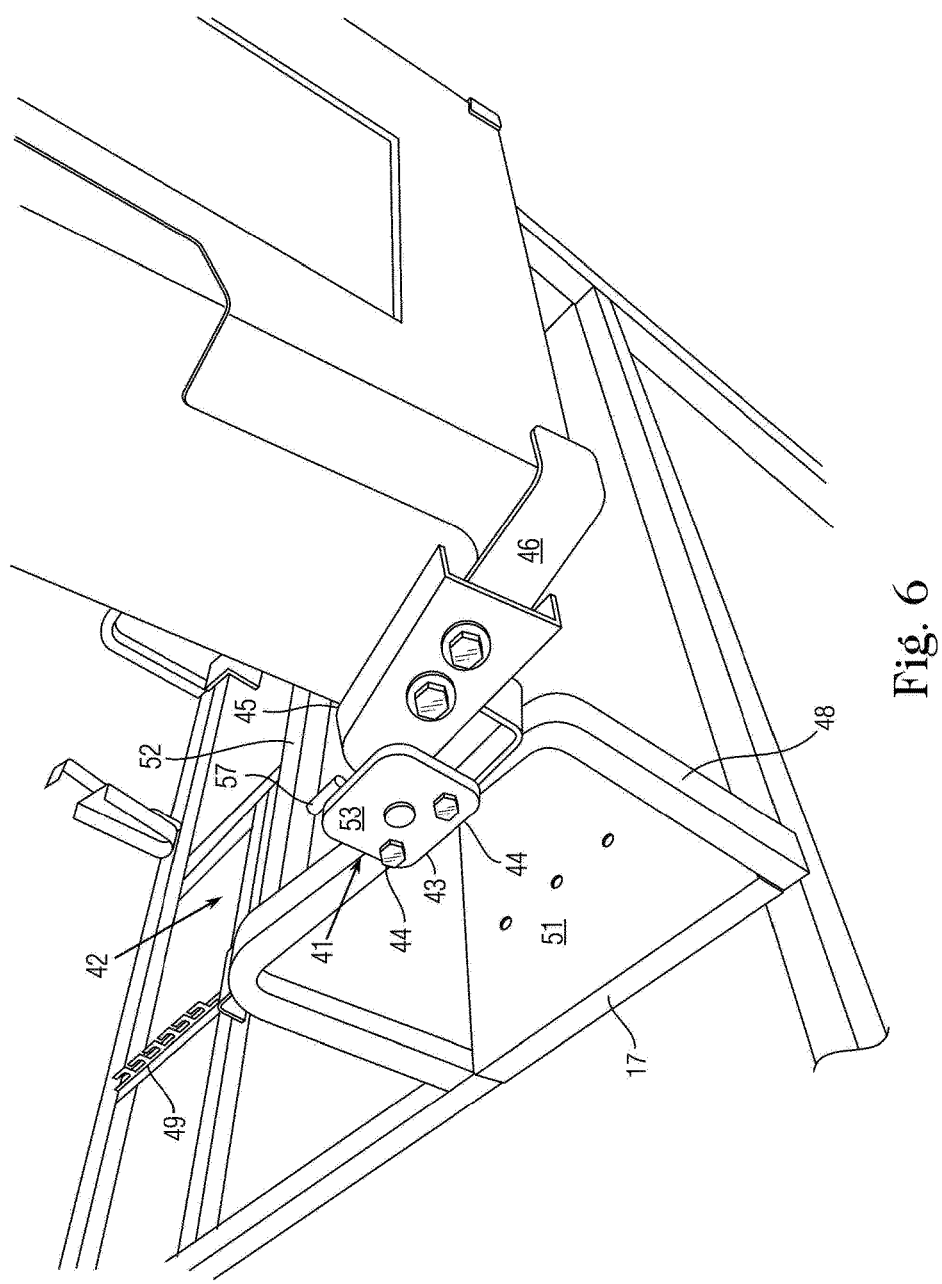
FIG. 6 is a close-up front perspective view of one of the articulating equipment supports.

FIGS. 5 and 6 are a close-up rear and front perspective view of one of the articulating equipment supports 41 (best seen in FIG. 4) atop elevated rear voting terminal mounting assembly 42. All three elevated voting terminal mounting assemblies 42 are elevated on risers 45, 47. The side risers 45 straddle the front and rear cross-struts 13 (best seen in FIG. 3) while the rear voting terminal mounting assembly 42 includes two spaced risers 47 each having one leg attached to rear cross-strut 13 (FIG. 4) and one leg attached to a medial cross-strut of H-shaped bracket 46 that spans front and back cross-struts 13 (FIG. 4). Preferably, all four articulating equipment supports 41 articulate such that the voting terminals may be set at various incremental inclines within a range as described above, that of rear voting terminal mounting bracket 42 ranging from 110 degrees (facing downward for wheelchair voters seated in front) to horizontal for stowage and transport. As seen in FIG. 5 a pair of upstanding backstops 54 extend upwardly from H-bracket 46 and delimit the ability of the voting terminals to flip backward more than a predetermined angle. As also seen in FIGS. 5-6 the rear voting terminal mounting bracket 42 is elevated atop a shelf 51 that spans the two spaced risers 47, and the risers 47 are connected by a reinforcing strut 52 for support. The elevated rear voting terminal mounting assembly 42 is raised for a standing voter. The front voting terminal mounting assembly 42 is flush with cross-struts 13, positioned at the proper level for a seated (ADA) voter. Elevating the rear but not the front also provides proper height so that both voting front/back terminals can be lowered to a full horizontal position for storage and transport. A power strip 93 is attached to the reinforcing strut 52 connecting risers 47 to power the voting equipment.

As seen in FIG. 6 each articulating equipment support 41 includes a cylindrical metal dowel 43 removably seated within opposing open-topped brackets 42, and captured therein by closed retaining plates 53 that are attached by screws 44 atop opposing open-topped brackets 42. Retaining plates 53 are made from a section of plastic material to optimize rotation, by minimizing friction which also reduces wear of metal to metal contact. The dowel 43 provides a horizontal pivot axis for mounting a pair of left and right holsters 45 for slidable insertion of an existing voting terminal by its ears as shown. Each holster 45 is an open triangular slide-in trough conforming to the voting terminal ears. An angle-bracket retaining arm 46 is screw-attached to each holster 45 and extends in front and around the voting terminal to retain it within holster 45. The voting terminal remains free to pivot thereabout, subject to a forward constraint imposed by delimiter stand-offs 57. The pivot angle is set by an indexed sawtooth-bracket 49 to accommodate voting terminals having a built-in rear stand. The built-in rear stand may be seated in the desired notches of indexed sawtooth-bracket 49 to affix the voting terminal at any desired tilt. The sawtooth brackets 49 extend rearwardly to damped pivot-stops 55 (as seen in FIG. 5) that are fixed angle brackets with rubber or felt pads there atop, the height of pivot-stops 55 being positioned to index the degree of rearward rotation of the voting terminals and hence the stowed positions. Thus, the first voting terminal is free to pivot to a vertical position indexed by delimiter pins 47 (as seen in FIG. 5) so that is directly faces a wheelchair voter, or can pivot back to a flat horizontal position against pivot-stop 55 for transport or for viewing by a standing voter, or any incremental position in between.

The above combination of the folding bottom floor 122 and articulating front voting assembly 42 makes the front voting station fully ADA-compliant inasmuch as it can serve as a wheelchair or standing station.

It should now be apparent that the multi-compartmentalized multi-cart 10 described above provides four separate voting stations in a quadrangle configuration (the front one being ADA-compliant), all for generating paper ballots to be taken to a remote VVPB tabulation station. However, another great strength of the above-described cart 10 is its reconfigurability.

Figure 7:
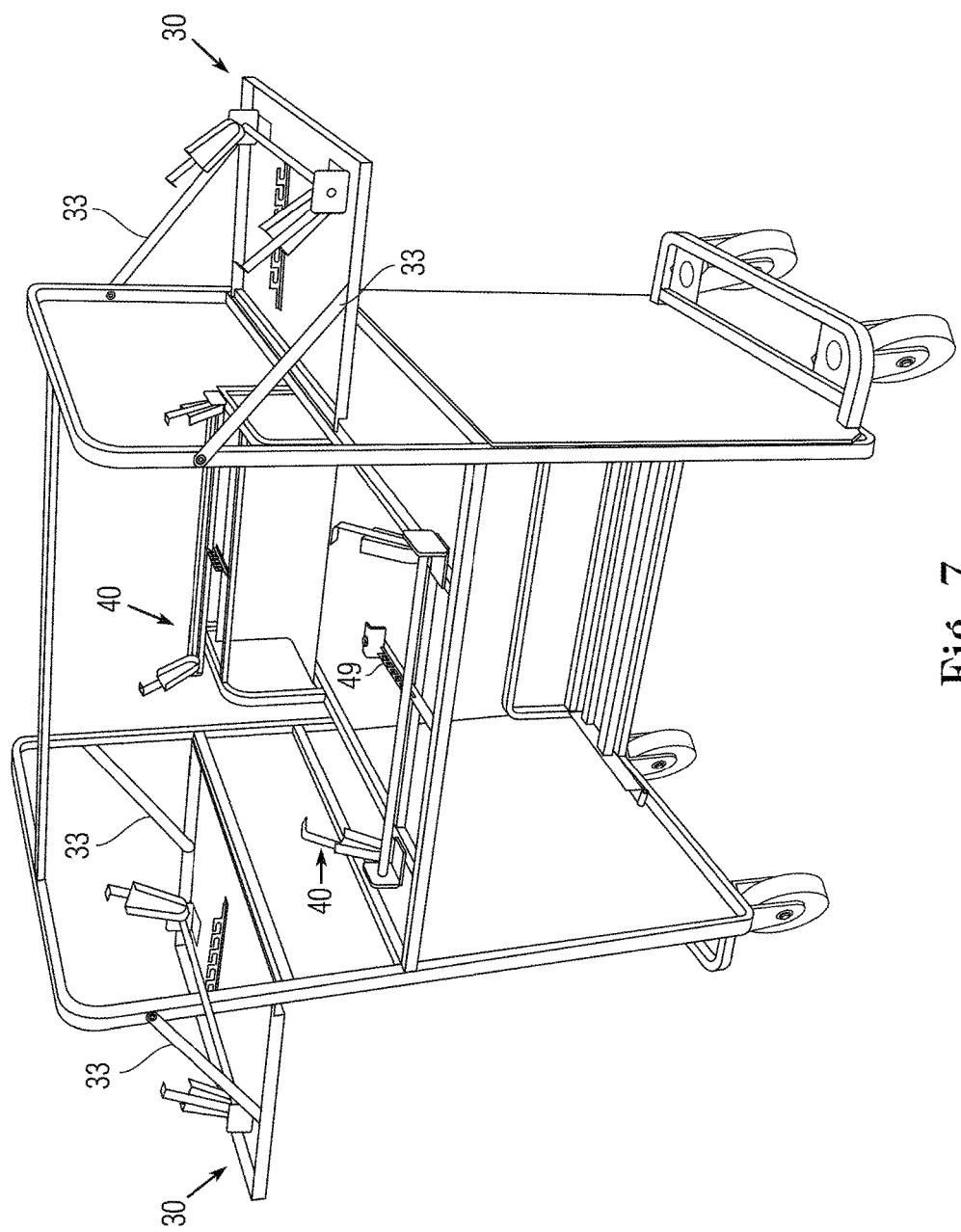
FIG. 7 is a front perspective view of an alternative configuration of the voter cart 10 showing the bottom shelf folded for ADA access and the optional articulating side shelves.

For example, if desired the multi-cart can be reconfigured to reduce the number of inboard voting terminals to two, resulting in a more compact unit, with the option to add two removable outboard (endwise) voting terminals. FIG. 7 illustrates how this is done with two front and back voting stations built into the cart 10. This results in two private voting stations, one of which is ADA compatible, for generating paper ballots, plus the ability to add two additional removable voting stations on optional onboard shelves. All four stations face each other, but to ensure complete privacy one or more of the stations can be equipped with an optional on-board deployable privacy mechanism 60 attached to the side rails 11 of cart 10 to enclose a voter standing or seated in front of the voting terminal. The configuration shown in FIG. 7 essentially moves side-rails 11 inward, pushes the side-facing terminal mounting assemblies 42 out onto protruding shelves, and inverts the two opposing platform sections 124 such that they protrude laterally outward approximately 5" from the bottom of side rails 11. In this case the outwardly-protruding platform sections 124 serve as bumpers, and the bumper corners can be fitted with corner pieces made from rubber, plastic, or other flexible material to soften any impact of cart 10 with a wall or other object, including an adjacent cart. This advantageously enhances the ability of cart 10 to be easily transported by laypeople such as those who regularly oversee the operation of polling places and organize and transport voting equipment in that carts 10 laden with heavy equipment will not be able to damage each other.

As seen in FIG. 7 the foregoing embodiment compacts the interior area. When collapsible, the side-open shelves 30 pivot down on hinges and are fixed in place by side struts 33 screwed to the shelves 30 and side-rails 11 as shown. When fixed the foregoing components are welded. The endwise pair of fixed voting terminal mounting brackets 44 are fixed atop the respective shelves 30. In all such cases when the voting terminals are removed from the shelves the voting terminals brackets can be pivoted flat and shelves 30 folded or slidably stowed to conceal and protect the endwise voting terminals brackets inside the multi-cart 10, the folding shelves 30 themselves blocking access. When stowed, the folding shelf 30 leaves the sides of the multi-cart 10 completely open with the shelf support acting as a handle The rectangular structure and the bumper features of the present invention advantageously make transportation and storage of the voting equipment on the carts themselves simpler and safer in that multiple carts may be "stacked" horizontally in close proximity to one another in a storage facility or on a truck bed wherein occasional jolts to one of the carts being stored or transported does not cause a large impact to be felt by the equipment on an adjacent or nearby cart.

Figure 8:
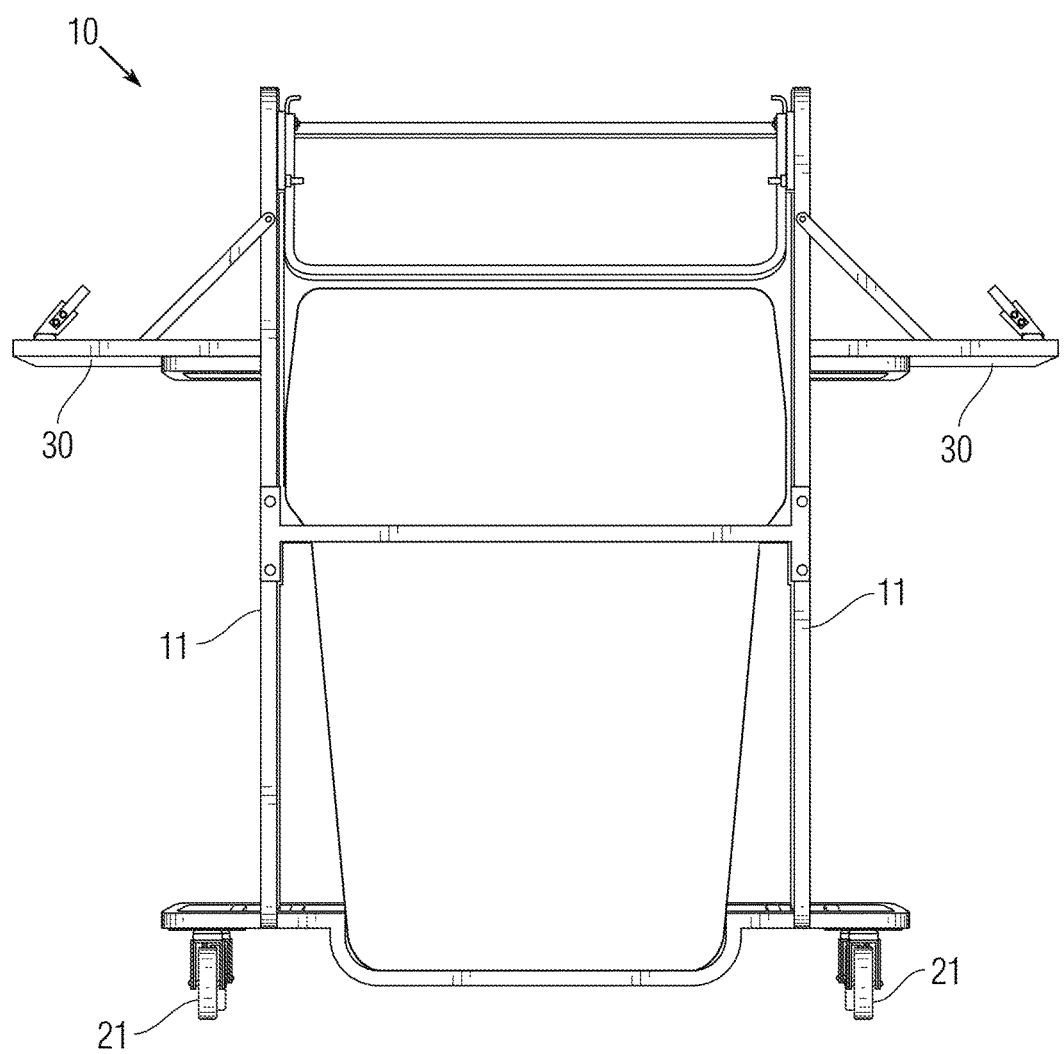
FIG. 8 is a front perspective view of an alternate configuration of the voter cart 10 with the VVPB tabulation station installed.
Figure 11:
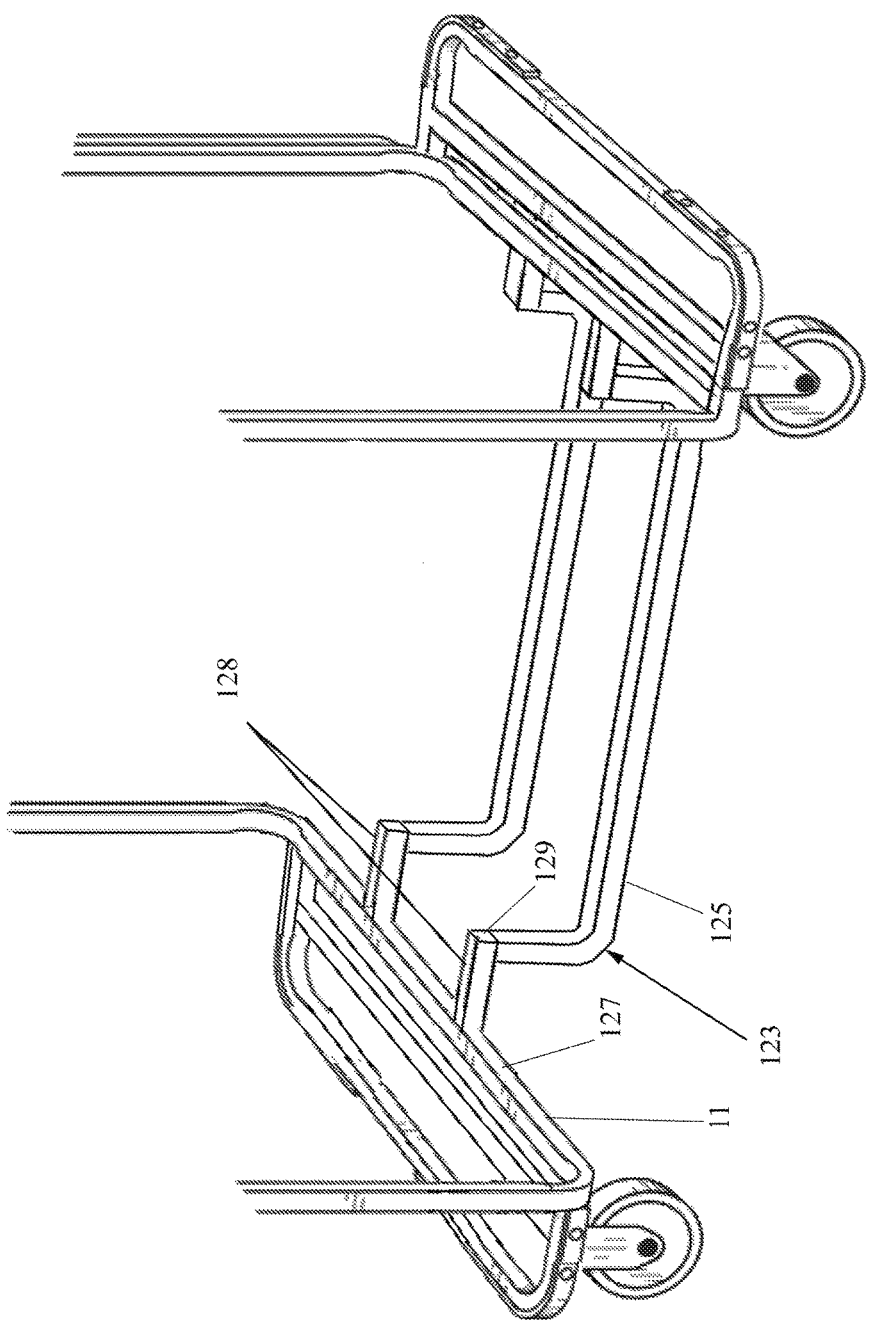
FIG. 11 is a perspective illustration of a permanent basket floor 123.

Alternatively, if desired, the multi-cart can be reconfigured to replace two of the voting terminals with a VVPB tabulation station, resulting in a compact unit with two endwise voting terminals and one VVPB tabulation station. FIG. 8 illustrates how this is done with a private VVPB tabulation station built into the cart 10 instead of the front and back voting terminals. This results in two private endwise voting stations for generating paper ballots, plus a private VVPB tabulation station accessible from the front of the multi-cart 10. All three stations face each other, but to ensure complete privacy one or more of the stations can be equipped with an optional on-board deployable privacy mechanism 60 attached to the side rails 11 of cart 10 to enclose a voter standing or seated in front of the voting terminal or ballot box. Because the ballot counter/vote tabulator is deployed at waist-level, it is easily accessible to standing or wheelchair voters. The configuration shown in FIG. 8 essentially moves side-rails 11 inward, pushes the side-facing terminal mounting assemblies 42 out onto protruding shelves, and inverts the two opposing platform sections 124 such that they protrude laterally outward approximately 5" from the bottom of side rails 11. In addition, as seen in FIG. 11 the pivoting platform floor 122 is replaced with a permanent basket 123 straddling the side rails 11. The basket 123 includes two opposed angle brackets 127 engaging the side rails 11, two spaced parallel segments 128 extending inward from the angle brackets 127 to plastic caps 129, and two recessed U-shaped cross-members 125 having a recessed U-shape depending from the segments 128. The slightly-protruding caps 129 keep the VVPB tabulation station centered on the U-shaped cross-members 125, which lower and support it at waist level. In this case the outwardly-protruding platform sections 124 serve as bumpers, and the bumper corners can be fitted with corner pieces made from rubber, plastic, or other flexible material to soften any impact of cart 10 with a wall or other object, including an adjacent cart. This advantageously enhances the ability of cart 10 to be easily transported by laypeople such as those who regularly oversee the operation of polling places and organize and transport voting equipment in that carts 10 laden with heavy equipment will not be able to damage each other.

As seen in FIG. 8 the foregoing embodiment compacts the interior area. When collapsible, the side-open shelves 30 pivot down on hinges and are fixed in place by side struts 33 screwed to the shelves 30 and side-rails 11 as shown. When fixed the foregoing components are welded. The endwise pair of fixed voting terminal mounting brackets 44 are fixed atop the respective shelves 30. In all such cases when the voting terminals are removed the voting terminal mounting brackets 42 can be pivoted flat and shelves 30 folded or slidably stowed to conceal the voting terminal mounting brackets 42 inside the multi-cart 10, the folding shelves 30 themselves blocking access. When stowed, the folding shelf 30 leaves the sides of the multi-cart 10 completely open with the shelf supports acting as a handle for ease of transport. The rectangular structure and the bumper features of the present invention advantageously make transportation and storage of the voting equipment on the carts themselves simpler and safer in that multiple carts may be "stacked" horizontally in close proximity to one another in a storage facility or on a truck bed wherein occasional jolts to one of the carts being stored or transported does not cause a large impact to be felt by the equipment on an adjacent or nearby cart.

In the embodiments shown in FIGS. 7 and 8 further privacy and security may be achieved by adding a removable deployable privacy mechanism 60 such as shown and described in U.S. application Ser. No. 14/739,949 filed 15 Jun. 2015, which is herein incorporated by reference, thereby draping a privacy curtain 65 about each voting station. The use and deployment of a removable deployable privacy mechanism 60 is shown in FIGS. 9-10. The equipment is fully accessible while on the cart 10, and the voting terminals attached to pivoting platform sections 124 are removed for storage and transport. During voting or transport, both voting terminals and the ballot box/tabulator are all fully restrained against side-to-side motion and fully attached to the cart 10 for tamper-proof use, and yet there is full frontal access to the control panels and consoles. Moreover, the particular design maximizes strength and usability, and yet keeps weight to a minimum with a framework that is as light weight as possible. After voting, the process is reversed and the cart 10 is removed without precinct workers lifting any equipment. Moreover, the present design is modular and can be easily scaled upward to add additional voting terminal enclosures 14 or ballot box enclosures 12 if so desired.

Having now fully set forth the preferred embodiment and certain modifications of the concept underlying the present invention, various other embodiments as well as certain variations and modifications of the embodiments shown and described will obviously occur to those skilled in the art upon becoming familiar with the concept. It is to be understood, therefore, that the invention may be practiced other than as specifically set forth herein.

We claim:

1. A utility cart for transporting voting machines comprising:
   a pair of opposing side-rails defined by contiguous tubing formed in a rectangular loop having first and second vertical rails, said first and second vertical rails being joined at a bottom end by a first horizontal rail and at a top end by a second horizontal rail, and having a horizontal strut running from said first vertical rail to said second vertical rail;
   a plurality of lateral struts joining said pair of opposing side-rails;
   a plurality of castors mounted beneath said side rails;
   a plurality of stand assemblies each for securing a voting terminal; and
   a rectangular platform floor pivotally suspended at two opposing corners between said opposing side-rails at bottom;
   wherein at least two of said plurality of stand assemblies are mounted on said plurality of lateral struts.

2. The utility cart for transporting voting machines according to claim 1, further comprising a privacy assembly attached to said pair of opposing side-rails and comprising a plurality of fixed interior panels defining open trapezoidal alcoves.

3. The utility cart for transporting voting machines according to claim 2, wherein said plurality of fixed interior panels comprise corrugated plastic panels.

4. The utility cart for transporting voting machines according to claim 2, wherein said privacy assembly further comprises a plurality of pairs of exterior partitions, each pair of said partitions flanking one of the open trapezoidal alcoves of the fixed interior panels for obscuring peripheral vision.

5. The utility cart for transporting voting machines according to claim 4, wherein each of said plurality of exterior partitions comprises a frame supporting a fabric panel.

6. A utility cart for transporting voting machines comprising:
   a pair of opposing side-rails defined by contiguous tubing formed in a rectangular loop having first and second vertical rails, said first and second vertical rails being joined at a bottom end by a first horizontal rail and at a top end by a second horizontal rail, and having a horizontal strut running from said first vertical rail to said second vertical rail;
   a plurality of lateral struts joining said pair of opposing side-rails;
   a plurality of castors mounted beneath said side rails;

a plurality of stand assemblies each for securing a voting terminal; and a rectangular platform floor pivotally suspended at two opposing corners between said opposing side-rails at bottom; and a privacy assembly attached to said pair of opposing side-rails and comprising a deployable pair of elongate jointed support arms attached at one end to said utility cart, and a privacy curtain suspended by said support arms.

7. The utility cart for transporting voting machines according to claim 1, wherein said plurality of stand assemblies further comprises either two or four stand assemblies for supporting and protecting a corresponding number of touch-screen voting terminals in a private quadrangle array.

8. A utility cart for transporting voting machines comprising:

a pair of opposing side-rails defined by contiguous tubing formed in a rectangular loop having first and second vertical rails, said first and second vertical rails being joined at a bottom end by a first horizontal rail and at a top end by a second horizontal rail, and having a horizontal strut running from said first vertical rail to said second vertical rail;

a plurality of lateral struts joining said pair of opposing side-rails;

a plurality of castors mounted beneath said side rails;

a plurality of stand assemblies each for securing a voting terminal, at least two of said plurality of stand assemblies being pivotable for orienting the respective touch-screen voting terminals at a desired viewing orientation, and a rectangular platform floor pivotally suspended at two opposing corners between said opposing side-rails at bottom.

9. The utility cart for transporting voting machines according to claim 8, wherein said four stand assemblies are pivotable for orienting the respective touch-screen voting terminals at a desired viewing orientation.

10. The utility cart for transporting voting machines according to claim 8, wherein at least one of said stand assemblies articulates the corresponding voting terminal within a range of from 110 degrees for a wheelchair voter seated in front to horizontal for stowage and transport.

11. The utility cart for transporting voting machines according to claim 8, wherein said platform floor pivots up from horizontal to accommodate a wheelchair voter seated in front.

12. The utility cart for transporting voting machines according to claim 1, wherein at least two of said plurality of stand assemblies are mounted on retractable shelves.

13. The utility cart for transporting voting machines according to claim 6, wherein at least two of said plurality of stand assemblies are mounted on retractable shelves, and said deployable privacy assembly deploys over one of said retractable shelves.

14. A utility cart for transporting voting machines comprising:

a pair of opposing side-rails defined by contiguous tubing formed in a rectangular loop having first and second vertical rails, said first and second vertical rails being joined at a bottom end by a first horizontal rail and at a top end by a second horizontal rail, and having a horizontal strut running from said first vertical rail to said second vertical rail;

a plurality of lateral struts joining said pair of opposing side-rails;

a plurality of castors mounted beneath said side rails;

a pair of stand assemblies each attached between a corresponding one of said side rails for securing a voting terminal thereto, said pair of stand assemblies each comprising a pair of latching holsters for releasable insertion of a corresponding voting terminal; and a floor suspended between said opposing side-rails at bottom for supporting a vote tabulation station centrally inside said utility cart between said pair of opposing side-rails.

15. The utility cart for transporting voting machines according to claim 14, further comprising a privacy assembly attached to said pair of opposing side-rails and comprising a plurality of fixed interior panels defining open trapezoidal alcoves.

16. The utility cart for transporting voting machines according to claim 15, wherein said plurality of fixed interior panels comprise corrugated plastic panels.

17. The utility cart for transporting voting machines according to claim 14, wherein said privacy assembly further comprises a plurality of pairs of exterior partitions, each pair of said partitions flanking one of the open trapezoidal alcoves of the fixed interior panels for obscuring peripheral vision.

18. The utility cart for transporting voting machines according to claim 17, wherein each of said plurality of exterior partitions comprises a frame supporting a fabric panel.

19. The utility cart for transporting voting machines according to claim 14, further comprising a privacy assembly attached to said pair of opposing side-rails and comprising a deployable pair of elongate jointed support arms attached at one end to said utility cart, and a privacy curtain suspended by said support arms.

20. The utility cart for transporting voting machines according to claim 14, wherein said plurality of stand assemblies further comprises two stand assemblies for supporting and protecting two touch-screen voting terminals in a private quadrangle array.

21. The utility cart for transporting voting machines according to claim 20, wherein said two stand assemblies are pivotable for orienting the respective touch-screen voting terminals at a desired viewing orientation.

22. The utility cart for transporting voting machines according to claim 20, wherein said two stand assemblies are retractable for orienting the respective touch-screen voting terminals from a stowed position interior of said side rails to a deployed position exterior of said side rails.

23. The utility cart for transporting voting machines according to claim 22, wherein said two stand assemblies are mounted on retractable shelves and said retractable shelves are pivotable.

24. The utility cart for transporting voting machines according to claim 23, wherein said retractable shelves are slidable.

25. The utility cart for transporting voting machines according to claim 19, wherein said pair of stand assemblies are mounted on retractable shelves, and said deployable privacy assembly deploys over one of said retractable shelves.

* * * * *